United States Patent [19]

Herring

[11] 4,176,491

[45] Dec. 4, 1979

[54] STORAGE STRUCTURE FOR ARTIFICIAL FLY-TYPE FISHING LURES

[76] Inventor: John L. Herring, 2626 S. 48th Ter., Kansas City, Kans. 66106

[21] Appl. No.: 882,103

[22] Filed: Feb. 28, 1978

[51] Int. Cl.$^2$ ............................................. A01K 97/06
[52] U.S. Cl. ................................................ 43/57.5 R
[58] Field of Search .......... 43/54.5 R, 57.5 A, 57.5 R; 206/379; 211/89, 120

[56] References Cited

U.S. PATENT DOCUMENTS

| | | | |
|---|---|---|---|
| 1,815,568 | 7/1931 | Jacqmein | 43/57.5 R |
| 2,610,430 | 9/1952 | Neiman | 43/57.5 R |
| 2,612,274 | 9/1952 | Earll | 211/89 |
| 3,154,192 | 10/1964 | Cowley | 206/379 |
| 3,507,071 | 4/1970 | Bryson | 43/57.5 R |
| 3,881,273 | 5/1975 | Herring | 43/57.5 R |

Primary Examiner—Nicholas P. Godici
Assistant Examiner—Robert P. Olszewski
Attorney, Agent, or Firm—Fishburn, Gold & Litman

[57] ABSTRACT

A structure for the storage transportation of artificial fly-type fishing lures includes a container having a base and an upstanding side wall with a free edge which defines an open end of the container. A closure member is shaped for mating with and sealing the open end of the container. A plurality of pegs are mounted on the container base, and are arranged in elongate rows. Each of the pegs is semi-rigid and tapers inwardly from the base to the free end thereof, whereby adjacently disposed pegs are adapted to receive and frictionally retain a hook portion of the lure thereinbetween for detachably and wedgingly locking the lure in the container.

7 Claims, 3 Drawing Figures

U.S. Patent  Dec. 4, 1979  4,176,491
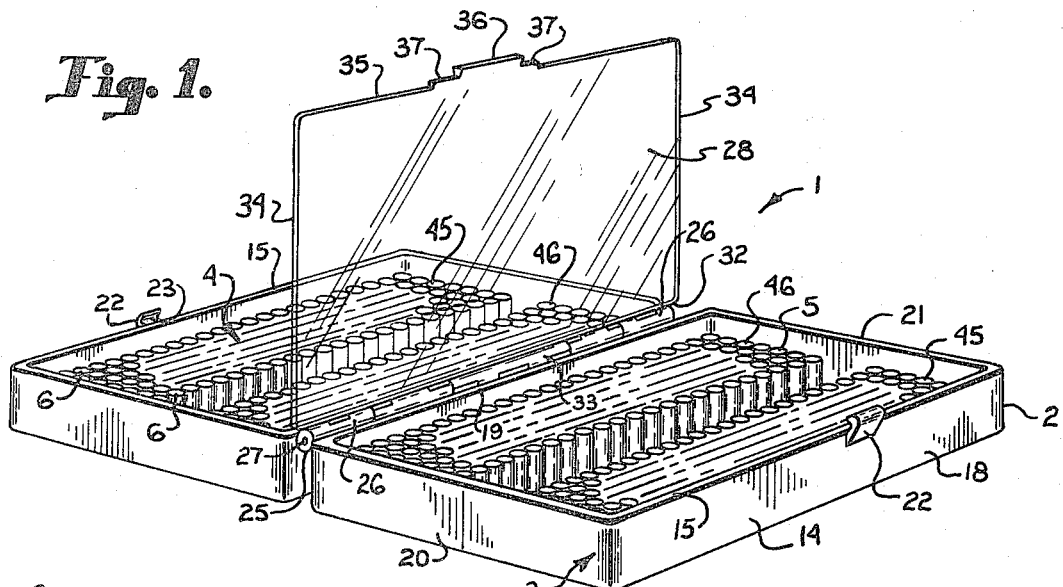
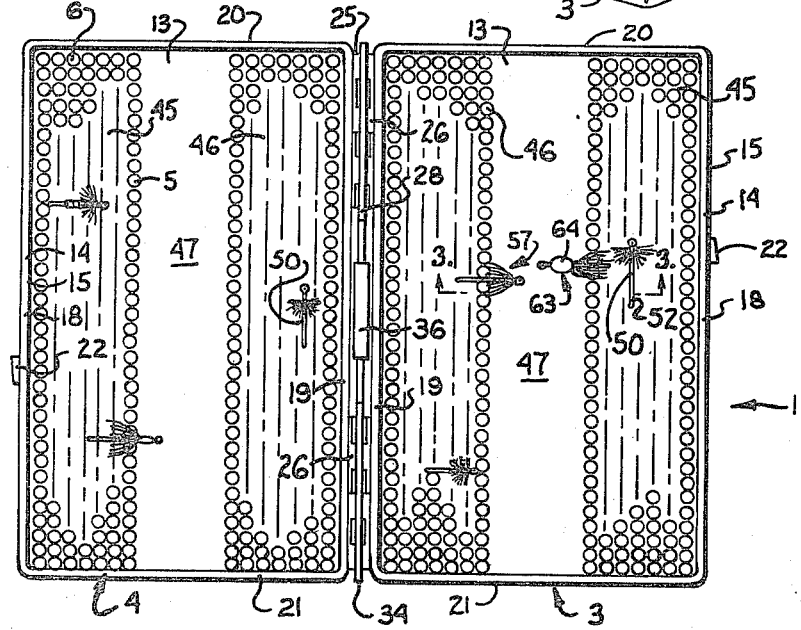
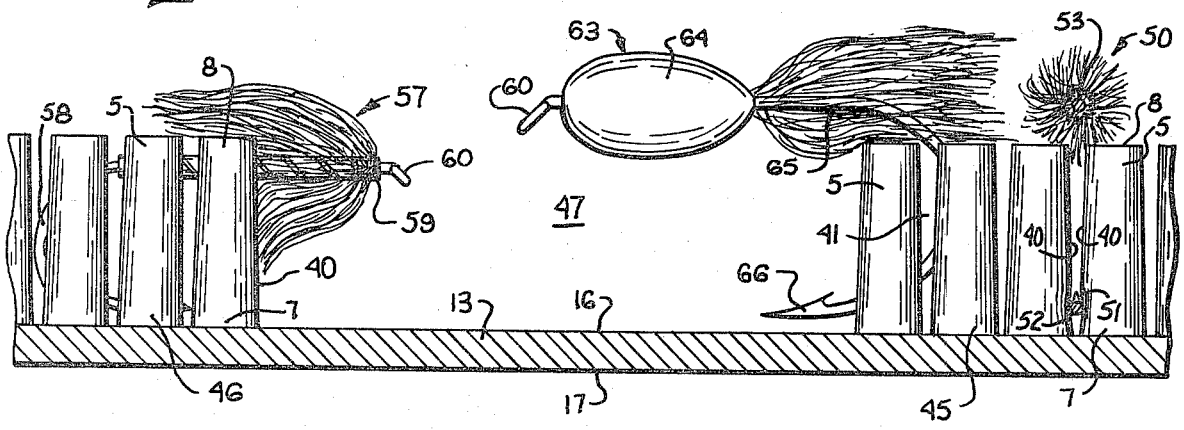

STORAGE STRUCTURE FOR ARTIFICIAL FLY-TYPE FISHING LURES

BACKGROUND OF THE INVENTION

The present invention relates to storage structures for fishing lures, and more particularly to a container for storing and transporting a plurality of artificial, fly-type lures.

"Fly-type" lures, such as flies and jigs, are typically constructed of a rigid, single hook, wherein the body of the lure is formed by wrapping or otherwise attaching various decorations, such as feathers or the like, to the shank of the hook to disguise the same and impart an alluring appearance thereto. Such lures are relatively small, lightweight, and delicate, and are typically used in fly fishing. Due to the small size of fly-type lures, it is important to store them in a secure and organized fahsion. It is further advantageous to store these lures in a compact fashion for easy transport, and preferably without a leader attached thereto, particularly when a long, tapered fly leader is used.

SUMMARY OF THE INVENTION

The present invention relates to a storage container for the special storage and transportation of artificial, fly-type fishing lures. A pair of relatively shallow, rectangular trays or sections with a partition therebetween are cooperatively, hingedly interconnected along one longitudinal side, and form a storage container or case. A clasp is provided on the partition and the mating portions of the tray section to securely close the storage structure for transportation.

The principal objects of the present invention are: to provide a storage structure to store and transport a plurality of spaced, artificial, fly-type fishing lures so as to protect the same and prevent entangling thereof; to provide such a storage structure which will hold the lures in a space apart arrangement to permit the same to dry more quickly and consequently alleviate deterioration; to provide such a structure which is adapted to hold and retain a plurality of fishing lures in such a manner that each one the flies may be selectively removed from the storage structure as needed without disturbing the remaining lures; to provide such a structure which is relatively small and lightweight, and which may be easily carried by one hand or in the pocket of a fisherman; to provide such a structure which will securely retain the flies therein in a safe manner and thereby preclude accidently snagging the hook component of the lure in the fisherman's clothing or flesh; to provide such a structure which provides ready access thereto by a fisherman so that he may easily transport and store the lures about his person and have them readily available when needed in fishing; and to provide such a storage structure which is economical to manufacture, attractive in appearance, durable in construction, and particularly well adapted for the proposed use.

Other objects and advantages of this invention will become apparent from the following description taken in connection with the accompanying drawings wherein are set forth, by way of illustration and example, certain embodiments of this invention.

BRIEF DESCRIPTION OF THE DRAWINGS

FIG. 1 is a perspective view of a storage structure embodying the present invention, shown in a fully opened position.

FIG. 2 is a top plan view of the storage structure, shown in a fully opened position and with lures retained therein.

FIG. 3 is an enlarged, fragmentary, horizontal cross-sectional view of the storage structure, taken along line 3—3, FIG. 2.

DESCRIPTION OF THE PREFERRED EMBODIMENT

As required, detailed embodiments of the present invention are disclosed herein, however, it is to be understood that the disclosed embodiments are merely exemplary of the invention and may be embodied in various forms. Therefore, specific structural and functional details disclosed herein are not to be interpreted as limiting, but merely as a basis for teaching one skilled in the art to variously employ the present invention and virtually any appropriately detailed structure.

For purposes of description herein, the terms "upper", "lower", "right", "left", "rear", "front", "vertical", "horizontal", and derivities thereof, shall relate to the invention as oriented in FIGS. 1 and 3, however, it is to be understood that the invention may assume various alternative orientations.

The reference numeral 1 generally designates a storage structure for aritficial, fly-type fishing lures, and includes a container 2 having two storage compartments 3 and 4 which are interconnected for positioning in a overlying relation. A plurality of posts or pegs 5 are mounted in each of the compartments, and are arranged in elongate rows 6. Each of the pegs 5 is rigidly resilient or semi-rigid, and tapers inwardly from a base portion 7 of the peg to a free end 8 thereof, whereby an adjacently disposed pegs are adapted to receive and frictionally retain a hook portion of the lure thereinbetween for detachably and wedingly locking the lure in the container.

Each of the storage compartments 3 and 4 includes a base 13 and an upstanding sidewall 14 which extends around the periphery of the base, and includes a free edge 15 which defines an open end of the container. In the illustrated structure, the storage compartments 3 and 4 are substantially identical in shape, and the description of the same shall therefore be limited to one side to avoid repetition. The base 13 includes an interior surface 16 and an exterior surface 17, and is generally planar and rectangular in shape. The sidewall 14 includes front, rear, and opposing side portions 18, 19, 20 and 21 respectively, which are preferably of the same height, and cooperate at the free edge 15 thereof to form the open end of the container. Preferably, the side wall portions have rounded corners, are integrally interconnected, and extend above the peg free ends a predetermined distance for accomodating a variety of differently shaped lures and retaining the same in the container.

The two storage compartments 3 and 4 are pivotally interconnected, whereby the same may be rotated into a closed position wherein the compartments overly each other. In this example, the compartments 3 and 4 are interconnected along the upper portion of the rear walls 19 by a hinge member 25 having the plurality of tubularly shaped segments 26 connected alternately with the two compartments, and extending therebetween. An elongate shaft or hinge pin 27 extends coaxially within the central aperture of each of the tubular segments 26 and interconnects the same. In the illustrated structure, a divider or partition 28 is pivotally connected with each of the storage compartments 3 and 4 along the hinge 25 and is rotatable therewith. The compartments are relatively small such that the structure folds closed into a compact design, capable of storage in a shirt pocket, and having an overall length, width and thickness in the nature of 5 3/16 inches and 1⅜ inches respectively.

A hook shaped clasp member 22 is connected with the front sidewall 18 of each of the storage compartments 3 and 4. In the illustrated example, the clasp members 22 are longitudinally spaced apart on the respective storage compartments 3 and 4, and each includes a concave, arcuately shaped retainer portion 23 which is oriented inwardly toward the rear sidewall 19, and extends upwardly a spaced apart distance from the sidewall free edge 15. The clasp members 22 are preferably constructed of a resilient material, such as a polypropylene, whereby the retainer portion 23 can pivot slightly for purposes to be described in detail hereinafter.

The partition 28 includes an inner edge 32 which is disposed along the hinge 25, and is connected to the hinge pin 27 by a tubular member 33. The partition 28 also includes opposing side edges 34, and a front edge 35. The partition 28 has a substantially planar shape, and the side edges 34 thereof are spaced apart a distance substantially coextensive with the distance between the side walls 20 and 21 of each of the storage compartments 3 and 4, whereby the same overlies each other in a sandwich fashion when the storage structure is in a closed position. The partition front edge 35 is positioned between and abuts the side wall free edge 15 along the front portion 18 when the structure is in the closed position. The partition 28 includes a handle member 36 which protrudes outwardly of the partition front edge 35 at a central portion thereof, and has a double convex longitudinal cross-sectional shape which tapers inwardly and is adapted for grasping by the user. Adjacent each end edge of the handle 36 is a rounded protuberance 37 which extends outwardly of the partition front edge 35, and is shaped to mate in a snap-lock manner with the retainer portion 23 of an associated one of the clasps 22. In the illustrated structure, the partition 28 is constructed of a transparent material, whereby the user may readily observe the location of a desired lure.

The pegs 5 are mounted in the storage compartments 3 and 4, and each peg includes a side surface 40 which tapers inwardly from the base end 7 to the free end 8. The illustrated pegs 5 extend substantially perpendicularly from the interior surface 16 of the base 13, and have a frustroconical shape, whereby the base and free ends 7 and 8 respectively of the peg are circular. Each of the pegs 5 is rigidly resilient or semi-rigid, whereby adjacently positioned pegs receive and frictionally retain a hook portion of the lure therebetween. In this example, the pegs 5 have a substantially identical dimensional configuration, and are molded integrally with the base 13 and side wall 14 from a very durable plastic material which will not react with the lures, such as vinyl, polypropylene, polyethylene, or the like. The rows 6 of pegs 5 are preferably laterally aligned from the rearwall 19 to the front wall 18 to form a rectangular array in which selected lures may be positioned in either a longtudinally or laterally extending orientation. The base end 7 of adjacently disposed pegs are spaced apart a predetermined distance to form a gap 41 to facilitate the storage of variously sized lures. An exemplary dimension for the gap is in the nature of 0.020 inches, which has been found to be slightly less than the smallest gauge of the barbed end of typical artificial fly-type fishing lures. The taper of the pegs 5 is from the circular base 7 to the free end 8, and the distance between the free ends of adjacent posts is slightly larger than the barbed portion of the hook whereby the same may pass therebetween. A distance in the nature of 0.042 inches has found to be satisfactory. In the illustrated structure, the peg base 7 has a diameter in the nature of 7/64 inches, a free end diameter in the nature of 3/32 inches, and a height in the nature of 5/16 inches. However, it is to be understood that the taper and size of the pegs may be varied in accordance with the size of the lures to be retained therein.

The pegs 5 in each of the illustrated storage compartments 3 and 4 are arranged in first and second groups 45 and 46 separated by an open alley or channel 47, devoid of pegs, and shaped for receiving protruding portions of the lures therein. In this example, the rows 6 of pegs 5 extend longitudinally in the storage compartments between the opposing sidewalls 20 and 21 thereof, and each row contains a full complement of equally and regularly spaced pegs, as schematically illustrated by the parallel longitudinally extending lines. The width of the channel 47 is at least as wide as a single row of pegs, and in the present example is substantially coextensive with the width of five rows of pegs.

In use, a typically sized fishing fly, such as that illustrated in FIG. 3, and designated by the reference numeral 50, is stored in the structure 1 by positioning the barbed end 51 of the hook 52 in a downwardly position between the rows of pegs 5 in a longitudinal or a lateral direction as shown in FIG. 2. A slight downward pressure is exerted by the user on the fly 50 until the barbed end 51 of the hook 52 is frictionally engaged by the side surfaces 40 of adjacent pegs. The point or points of frictionally engagement along the side surfaces 40 of the associated pegs varies a distance from the interior surface of the base 13 according to the diameter or gauge of the hook component. Thus, small gauge hooks will frictionally engage at a point along the side surfaces nearer to the base 7 of the pegs. At least one pair of adjacent pegs frictionally engages the barbed end of the hook 52, and as illustrated in FIG. 3, the hook is typically engaged by two or more pairs of adjacent pegs. With the average size fly 50, the body portion 53 thereof is typically disposed above the free end 8 of the peg, and may therefore be oriented either laterally or transversely in the storage compartment.

For very small or usually shaped flies, such as that illustrated in FIG. 3 and designated by the reference numeral 57, the point of engagement between the hook 58 and associated pegs 5 may be such that the body portion 59 and eyelet portion 60 of the lure are disposed below the free end 8 of the pegs. To assist in the engagement and removal of such fishing flies, the fly 57 is positioned transversly in the compartment, whereby the forward most eyelet portions 60 of the fly extends outwardly into the channel 47. The channel 47 thereby allows the user to securely seat the fly 57 between the associated pegs, and to grasp the fly with thumb and forefinger for the removal of the fly without interference with the pegs 5.

Other fly-type fishing lures, such as the illustrated jig 63 have protrusions thereon such as the illustrated ovate, bulbous flotation portion or head 64, and/or of such a dimension that same are too large to be received between the uppermost portion of the gap 41 between adjacent pegs. Under these circumstances, the jig 63 is inserted into the compartment in the manner illustrated in FIG. 3, wherein the jig is oriented transversely in the compartment, and the head portion 64 thereof extends into the channel 47. The hook portion 65 of the jig extends rearwardly thereof, engages the associated pegs in the aforementioned manner, and retains the jig securely in the storage structure.

When the storage structure is in the fully closed position. the partition 28 overlies both of the storage compartments 3 and 4. The distance between the free end 8 of the pegs and the associated surface of the partition is such that the same abuts the body portion of those lures which extend outwardlymost of the pegs, and is also positioned adjacent to the remaining lures, for preventing outward translation of the lures, and maintaining frictional engagement between the hook portion of the lures and the pegs. To remove a lure from the storage structure, the user selects that compartment in which the particular lure is located, grasps the handle 36 with one hand and the chosen compartment in the other hand, and pulls the same apart. The clasp 22 is thereby released from the mating lip 37, and the chosen compartment is separated from the partition 28 and the non-selected compartment which remain interconnected to prevent the flies in the non-selected compartment from becoming dislodge from the pegs 5. Slight upward pressure is applied to the body portion of the selected lure, and the hook portion of the lure is consequently pulled outwardly from inbetween the associated pegs, and is separated therefrom. In this manner, the artificial fishing lure may be removed from the selected storage compartment without disturbing the remaining lures, and the structure may again be returned to its fully closed position for storage and transport.

It is to be understood that while I have illustrated and described certain forms of my invention, it is not to be limited to these specific forms or arrangement of parts herein described and shown.

I claim:

1. A storage structure for artificial fly-type fishing lures, said storage structure comprising:
   (a) a container having a base and an upstanding side wall; said side wall having a free edge defining an open end of said container;
   (b) a closure shaped for mating with and sealing the open end of said container;
   (c) a plurality of pegs mounted in said container and arranged in a plurality of elongate rows such that the pegs in adjacent rows are laterally in-line; each of said pegs having one end thereof connected with the base of said container, and a free end thereof extending substantially normally thereof; each of said pegs being semi-rigid, and having a frustroconical shape which tapers inwardly from the one end to the free end thereof, whereby adjacently disposed pegs are adapted to receive and frictionally retain a rigid hook portion of one of said lures thereinbetween for detachably and wedgingly locking said lure in said container.

2. A storage structure as set forth in claim 1 wherein:
   (a) said one end of said adjacently disposed pegs are spaced apart a predetermined distance to facilitate the storage of variously sized lures.

3. A storage structure as set forth in claim 1 wherein:
   (a) said pegs are arranged in first and second groups; and
   (b) said first and second groups of pegs are separated by an open alley shaped for receiving protruding portions of said lures therein.

4. A storage structure as set forth in claim 1 wherein:
   (a) said rows of pegs extend longitudinally in said container, and are laterally aligned; and
   (b) said pegs are arranged in first and second groups separated by a longitudinally extending and centrally disposed open alley shaped for receiving protruding portions of said lures therein.

5. A storage structure as set forth in claim 1 wherein:
   (a) said adjacently disposed pegs define a gap thereinbetween; and
   (b) said gap has a width of 0.020 inches at the one end of said pegs, and a width of 0.042 inches at the free end of said pegs.

6. A storage structure as set forth in claim 1 wherein:
   (a) said closure has a substantially planar shape, is hingedly connected to said container side wall, and overlies the free edge of said container in a closed position;
   (b) said pegs each have an upper surface;
   (c) said closure has an interior surface; and
   (d) said peg upper surface and said closure interior surface are spaced apart a predetermined distance, whereby said closure is adapted to abut an upper portion of said lure and maintain frictional engagement between said hook portion of the lure and said pegs.

7. A storage structure as set forth in claim 6 wherein:
   (a) said one end of said adjacently disposed pegs are spaced apart a predetermined distance of facilitate the storage of variously sized lures;
   (b) said pegs each are dimensionally identical; and
   (c) said rows of pegs extend longitudinally in said container.

* * * * *